Oct. 18, 1966  E. F. SEASHOLTZ  3,279,246
FORCE MEASURING DEVICE
Filed Jan. 27, 1964
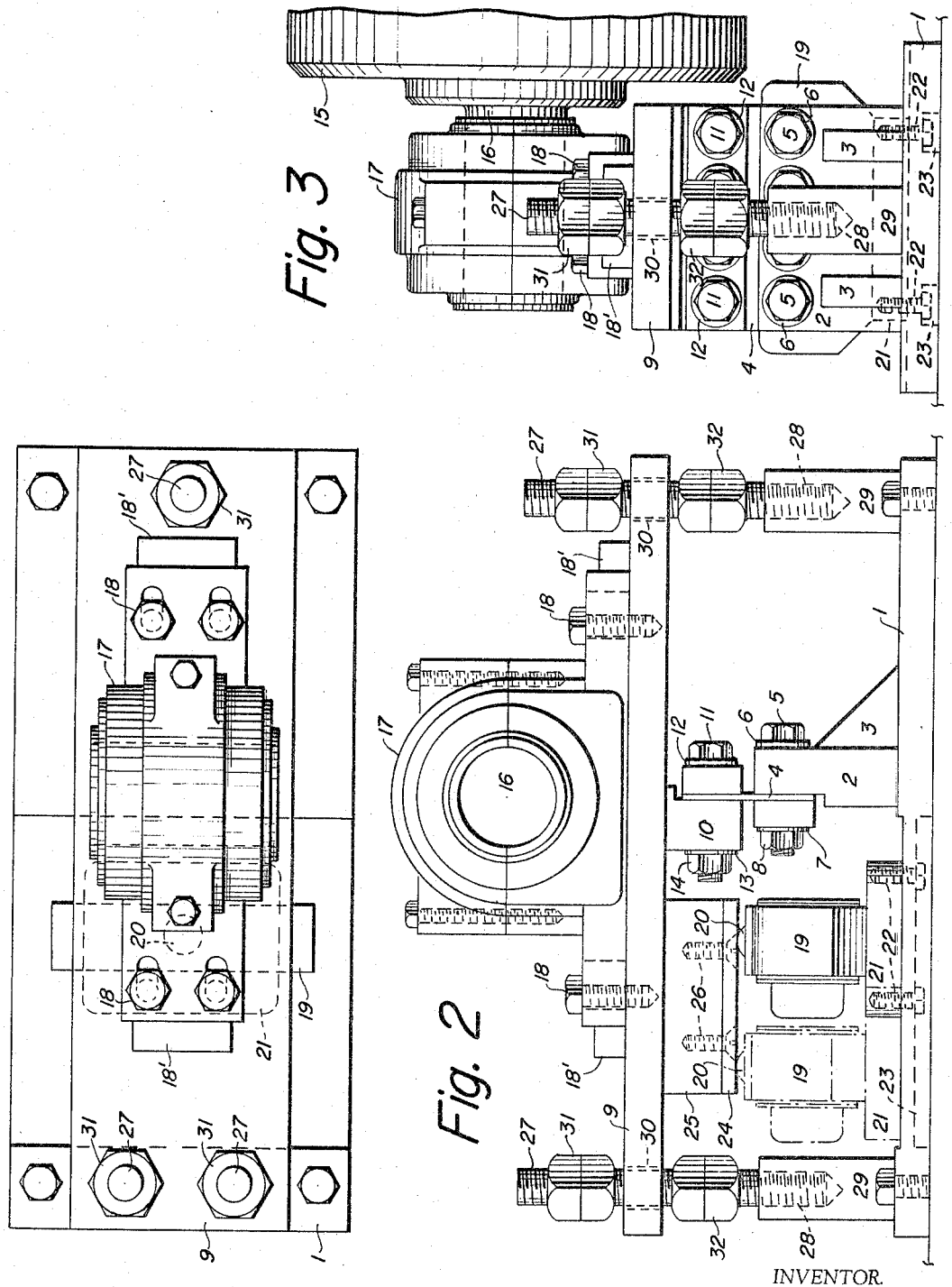
INVENTOR.
Elwood F. Seasholtz

United States Patent Office 3,279,246
Patented Oct. 18, 1966

3,279,246
FORCE MEASURING DEVICE
Elwood F. Seasholtz, Bethlehem, Pa., assignor, by mesne assignments, to Bethlehem Steel Corporation, a corporation of Delaware
Filed Jan. 27, 1964, Ser. No. 340,283
1 Claim. (Cl. 73—141)

This invention relates to force measuring devices and more particularly to a simple and reliable device of this type which comprises a load cell and roll mounting.

The tension of metal strip or other flexible material passing around a movably mounted roll can be accurately measured by a sensitive load cell which is connected to a suitably calibrated measuring device. This equipment may well be part of an automation circuit if desired.

A conventional mounting for such a roll is basically a flat plate which is hinged at one end to permit angular deflection and supported at the other end by a load cell. With such a mounting the tare weight of the roll and the pillow block which holds it is always included in the reading. The tare load of the roll places the load cell initially under compression. An upward pull exerted by the strip load will decrease this force and/or reverse it to tension. The load cell is therefore in compression when the strip load is low, and in tension when the strip load is high. Such installations require the use of rather costly universal load cells with special readout instruments that detect reversals in polarity or phase as the load cell output goes through the zero point.

My invention utilizes a flexible type of pivot which is adapted to be positioned vertically above or below the center of gravity of the roll and each bearing or pillow block, so that the tare weight of the roll and pillow block is supported solely by the pivot. Accordingly, the load cell receives no load from the tare weight, so that simple and relatively inexpensive compression load cells and single polarity instruments can be used to obtain exact readings.

One object, therefore, is to provide a force measuring device including a pillow block and a load cell, which device is accurate, simple and inexpensive.

Another object is to provide a flexible center pivot type of mounting for such a device.

Additional objects, purposes and advantages of my invention will be set forth hereinafter in the specification and drawings, and in the appended claim.

In the drawings:
FIGURE 1 is a top plan view of an embodiment of my invention;
FIGURE 2 is a side elevation of the invention; and
FIGURE 3 is an end elevation of the invention.

Referring in more detail to the drawings, each side of a preferred embodiment of the invention will include a primary base member such as the elongated rectangular base plate 1. Rigidly welded in upright position on said base plate 1 is a transversely extending central support plate 2 with a firm side brace 3. A vertical flexible leaf spring 4 is tightly secured to said support plate 2 by conventional fastening means such as the lower group of through bolts 5, washers 6, lock-washers 7 and nuts 8.

A secondary base member or roll platform 9 is positioned in vertically parallel relation to the base plate 1 by means of a dependent lug 10 which is welded to the underside of said platform member 9. This lug 10 is tightly secured to the leaf spring 4 by means of the additional through bolts 11, washers 12, lock-washers 13 and nuts 14. A complete roll assembly includes a transverse horizontal roll 15 having its opposite neck ends 16 journaled in conventional pillow-blocks 17 secured by bolts 18 between the welded chock blocks 18' on each platform 9. Each platform 9 with its associated pillow block and roll has its center of gravity positioned vertically above (or below) its leaf spring 4. Said leaf spring 4 is thus enabled to function as a pivot which is proportionally responsive to any displacement of the axis of the roll caused by changes in tension in a moving strip or web (not shown), which is preferably wrapped around a considerable portion of the circumference of the roll.

The amount of such displacement is measured by means of a standard compression type strain gage load cell 19 having a depressible plunger member 20 which varies in resistance according to strain and controls an electric circuit leading to standard current-measuring means (not shown). The bottom of the base plate 1 is provided with a pair of parallel recessed slots 23 extending sidewise at a right angle away from the center of said base plate. A slide block 21 is movably secured by square head bolts 22 in said slots, and provides a mounting for the load cell 19. Said load cell 19 is thus adjustable over a range of positions, from about the inner position in which the load cell 19 is shown in solid lines, to the outer position in which the load cell is shown in chain lines. The plunger 20 is engaged by hardened steel face plate 24 on upper spacer block 25 to which it is fastened by screws 26. Said block 25 is secured to the lower face of the platform member 9. The point of flexure of the leaf spring 4 and the level at which the face plate 24 is in contact with the load cell plunger 20 are at about the same elevation above the base plate 1.

To simplify removal and replacement of the load cell 19 without removing the base plate 1 from its support, the bolts 22 may be inverted and inserted from the upper side so as to engage square nuts (not shown) in the slots 23.

In case of failure of the leaf spring 4, the alignment of the primary and secondary base members is maintained by the double-ended vertical guide studs 27 mounted in tapped holes 28 in upright end plates 29 welded on the base plate 1. The upper ends of said studs 27 extend through slightly larger holes 30 in the platform member 9. The limits of vertical movement of the ends of plate 9 can be varied by adjusting nuts 31 and 32.

The guide studs 27 are also intended to be used for supporting the platform member 9 when the load cell 19 is to be checked under "no load" conditions or removed for repair. It is not necessary to reduce the tension on the strip while the load cell is being zero-checked or removed, because the spacing of the roll 15 and pillow block 17 from the base plate 1 remains fixed by the leaf spring 4, and the nuts 31 and 32 may be adjusted to raise the ends of the platform 9 a sufficient distance so that the face plate 24 will be out of contact with the load cell plunger 20.

In the arrangement shown in the drawings, the base plates are level so that the tare weight of the roll and pillow block assembly may be supported solely by the leaf spring and still be in contact with the load cell plunger. Other arrangements can be made in which the base plates need not be level or parallel.

In actual installations, the primary base member 1 is mounted in a stationary position with respect to the traveling material such that the leaf spring 4 is vertically aligned above or below the center of gravity of the pillow block 17 and roll 15 when the platform 1 is level. Tension on the strip engaging roll 15 will cause flexure of leaf spring 4. The resultant tilting of platform 9 will compress plunger 20 of load cell 19, thereby actuating through suitable electrical circuits a meter or recording device which is calibrated to measure the tension on the strip.

Assuming that the strip force resultant and lever arm are constant, the force on the load cell 19 becomes less as the load cell is moved further away from the leaf spring 4. The rotational moment must remain constant. As the load cell lever arm increases, the load cell force decreases to maintain the same moment. Therefore, the load cell sensitivity is greater at the inner position.

By means of a conventional Wheatstone bridge or other balancing means in the electrical circuit, the initial current in the circuit can be adjusted to zero when there is no compressive load on the load cell.

The load cell 19 is designed to be responsive only to compressive forces exerted upon it, which will change its electrical resistance proportionately, and the meter connected to it should properly show zero current at no load.

In order to eliminate a source of gravitational error at the start, when the base plates are horizontal it is requisite that the flexible leaf spring 4 be in a vertical position, and that the base plate 1 be horizontal, so that the center of gravity of the unloaded assembly will be directly above or below said leaf spring 4, in order that the tare weight of the roll and pillow block will not be included in the reading at no load. The device must also be so positioned that the load cell is on that side of the leaf spring 4 toward which said leaf spring 4 flexes under the resultant of the component forces exerted by the entering and exit portions of the strip.

As described above, the device operates when tension applied to the strip traveling over roll 15 causes the roll platform 9 which serves as a mounting plate for the pillow block 17 to be tilted and pressed against the plunger 20. This requires that the strip be wrapped at least partially around said roll 15 and that the resultant of the forces applied to the roll by strip tension be in a direction to cause such tilting. The device as shown in FIGURE 2 would be satisfactory for a strip entering from the left of said figure, passing over said roll and then downwardly (or alternatively for a strip entering from the bottom of the figure, passing over roll 15 and then to the left). Obviously the device can be turned end for end, or upside down, to accommodate different directions of force resultants. Also, obviously, a tension cell can be substituted for compression cell 19, in which event the mounting of the device will be changed accordingly.

The angle of the resultant force relative to the leaf spring 4 need not be large in order to establish a reliable mathematical relationship between the resultant force and the loading on the load cells.

Once adjusted, the simplicity and ruggedness of this device render its repair and maintenance matters of very slight expense or trouble throughout a long operating life.

I claim:

A force measuring assembly comprising
(a) a primary base member,
(b) a secondary base member including a rotatable member journaled thereon for rotation about a horizontal axis,
(c) a flexible leaf spring mounting for said secondary base member on said primary base member and constituting pivot means permitting displacement of the axis of the rotatable member in response to changes in tension of material passing therearound, said leaf spring mounting having its faces vertically disposed and parallel to the axis of said rotatable member and being located in vertical alignment with the center of gravity of said secondary base member, and
(d) a load measuring device disposed laterally of said leaf spring and actuated by displacement of the axis of said rotatable member,
(e) in combination with a counterpart second such assembly, with the rotatable member being mounted between the secondary base members thereof.

References Cited by the Examiner

UNITED STATES PATENTS

| | | | |
|---|---|---|---|
| 2,623,385 | 12/1952 | Jamieson | 73—136 |
| 2,650,495 | 9/1953 | Norton | 73—143 |
| 2,761,314 | 9/1956 | Vernier | 73—134 |
| 3,182,495 | 5/1965 | Johnson | 73—141 |

RICHARD C. QUEISSER, *Primary Examiner.*

C. A. RUEHL, *Assistant Examiner.*